(12) United States Patent
Liu et al.

(10) Patent No.: US 11,398,677 B2
(45) Date of Patent: Jul. 26, 2022

(54) LIQUID CRYSTAL PHASE SHIFTER, LIQUID CRYSTAL ANTENNA AND MANUFACTURING METHOD OF LIQUID CRYSTAL PHASE SHIFTER

(71) Applicant: TRUWIN OPTO-ELECTRONICS LIMITED, Guang Dong (CN)

(72) Inventors: Zhisheng Liu, Guangdong (CN);
Xiangzhan Xu, Guangdong (CN);
Lixiong Wang, Guangdong (CN);
Yingqun Huang, Guangdong (CN);
Huxin Wang, Guangdong (CN);
Duanqing Zan, Guangdong (CN);
Jiqiang He, Guangdong (CN)

(73) Assignee: TRUWIN OPTO-ELECTRONICS LIMITED, Guang Dong (CN)

( * ) Notice: Subject to any disclaimer, the term of this patent is extended or adjusted under 35 U.S.C. 154(b) by 224 days.

(21) Appl. No.: 16/770,957

(22) PCT Filed: Apr. 11, 2019

(86) PCT No.: PCT/CN2019/082162
§ 371 (c)(1),
(2) Date: Jun. 9, 2020

(87) PCT Pub. No.: WO2020/199238
PCT Pub. Date: Oct. 8, 2020

(65) Prior Publication Data
US 2021/0234268 A1    Jul. 29, 2021

(30) Foreign Application Priority Data

Apr. 4, 2019   (CN) .......................... 201910272556.9

(51) Int. Cl.
*H01Q 3/36*    (2006.01)
*H01P 1/18*    (2006.01)
(Continued)

(52) U.S. Cl.
CPC ............. *H01Q 3/36* (2013.01); *G02F 1/1313* (2013.01); *H01P 1/184* (2013.01); *H01P 11/00* (2013.01)

(58) Field of Classification Search
CPC .... G02F 1/1313; G02F 1/1303; G02F 1/1333; G02F 1/13; H01P 1/18; H01P 1/184;
(Continued)

(56) References Cited

U.S. PATENT DOCUMENTS 6,356,166 B1 *  3/2002  Goldsmith ........... H05K 1/0251
                                                    342/368
6,681,005 B2    1/2004  Liao et al.
(Continued)

FOREIGN PATENT DOCUMENTS

CN   108321086   7/2018
CN   108493592   9/2018
(Continued)

OTHER PUBLICATIONS

Office Action of Taiwan Counterpart Application, dated Dec. 21, 2020, pp. 1-8.
(Continued)

*Primary Examiner* — Tho G Phan
(74) *Attorney, Agent, or Firm* — JCIP Global Inc.

(57) ABSTRACT

A liquid crystal phase shifter includes a first substrate and a second substrate which are disposed oppositely, and a liquid crystal layer located between the first substrate and the second substrate. A first metal film layer is disposed on a side of the first substrate facing the second substrate. A second metal film layer is disposed on a side of the second substrate facing the first substrate. The first metal film layer and the second metal film layer are both patterned metal film layers. The first substrate and the second substrate are both PCBs. The present disclosure further provides a liquid crystal
(Continued)

antenna, including the abovementioned liquid crystal phase shifter. The present disclosure further provides a manufacturing method of the liquid crystal phase shifter.

4 Claims, 3 Drawing Sheets

(51) Int. Cl.
*G02F 1/13* (2006.01)
*H01P 11/00* (2006.01)

(58) Field of Classification Search
CPC ........... H01P 3/08; H01P 3/081; H01P 11/00; H01Q 3/36; H01Q 1/38; H01Q 1/50; H01Q 3/26; H01Q 21/06; H01Q 21/22
See application file for complete search history.

(56) References Cited

U.S. PATENT DOCUMENTS

| | | | |
|---|---|---|---|
| 11,233,301 B2* | 1/2022 | Wang | H01Q 1/22 |
| 2014/0022029 A1* | 1/2014 | Glushchenko | H01P 1/184 |
| | | | 977/773 |
| 2017/0229784 A1 | 8/2017 | Kitamura et al. | |
| 2018/0159239 A1 | 6/2018 | Wyler et al. | |
| 2019/0027808 A1* | 1/2019 | Mow | H04R 5/04 |

FOREIGN PATENT DOCUMENTS

| | | |
|---|---|---|
| CN | 108803096 | 11/2018 |
| WO | 2018066459 | 4/2018 |

OTHER PUBLICATIONS

Office Action of China Counterpart Application, dated Mar. 16, 2020, pp. 1-4.
"Search Report of Europe Counterpart Application", dated Dec. 10, 2020, pp. 1-9.

* cited by examiner

LIQUID CRYSTAL PHASE SHIFTER, LIQUID CRYSTAL ANTENNA AND MANUFACTURING METHOD OF LIQUID CRYSTAL PHASE SHIFTER

CROSS-REFERENCE TO RELATED APPLICATION

This application is a 371 of international application of PCT application serial no. PCT/CN2019/082162, filed on Apr. 11, 2019, which claims the priority benefit of China application no. 201910272556.9, filed on Apr. 4, 2019. The entirety of each of the above-mentioned patent applications is hereby incorporated by reference herein and made a part of this specification.

BACKGROUND

Technical Field

The present disclosure relates to the technical field of wireless communications, and more particularly relates to a liquid crystal phase shifter, a liquid crystal antenna and a manufacturing method of the liquid crystal phase shifter.

Description of Related Art

The development of information networks is changing rapidly, and major changes are occurring or will occur in various fields. Hotspot technologies include 5G and satellite mobile Internet communication technologies.

As a core device for sending and receiving communication information, an antenna has become a key factor that affects performance indexes of an information network and user application effects.

At the present, since spectrum resources of wireless electromagnetic waves in low and high frequency bands (below centimeter wave, such as frequency being less than or equal to 10 GHz) are in a great shortage, spectrums above ultra-high frequency bands (centimeter wave to terahertz, above 10 GHz) can be developed and utilized only.

A liquid crystal phase shifter is a key component of the liquid crystal antenna. How to design and manufacture a liquid crystal phase shifter and a liquid crystal antenna suitable for the spectrums above the ultra-high frequency bands is a problem to be solved by those skilled in the art.

SUMMARY

In order to solve the above problem, the present disclosure provides a liquid crystal phase shifter, a liquid crystal antenna and a manufacturing method of the liquid crystal phase shifter.

The present disclosure provides a liquid crystal phase shifter, including a first substrate and a second substrate which are disposed oppositely, and a liquid crystal layer located between the first substrate and the second substrate. A first metal film layer is disposed on a side of the first substrate facing the second substrate. A second metal film layer is disposed on a side of the second substrate facing the first substrate. The first metal film layer and the second metal film layer are both patterned metal film layers. The first substrate and the second substrate are both printed circuit boards (PCBs).

Preferably, a transparent first carrier layer is arranged between the first metal film layer and the first substrate, and a transparent second carrier layer is arranged between the second metal film layer and the second substrate.

Preferably, a first adhesive layer is arranged between the first carrier layer and the first substrate, and a second adhesive layer is arranged between the second carrier layer and the second substrate.

Preferably, the PCBs are polytetrafluoroethylene (PTFE) high-frequency boards.

Preferably, the first metal film layer and the second metal film layer are copper layers.

Preferably, the thicknesses of the first metal film layer and the second metal film layer are not less than 2.0 μm.

Preferably, the first carrier layer and the second carrier layer are polyimide (PI) layers.

Preferably, the first carrier layer and the first metal film layer are integrated copper foil-cladded PI base materials, and the second carrier layer and the second metal film layer are integrated copper foil-cladded PI base materials.

The present disclosure further provides a liquid crystal antenna, including the abovementioned liquid crystal phase shifter. The liquid crystal antenna further includes an antenna radiation unit.

The present disclosure further provides a manufacturing method of a liquid crystal phase shifter, which is used for manufacturing the abovementioned liquid crystal phase shifter. The manufacturing method includes the following steps:

step S1: providing a first substrate being a PCB, wherein the first substrate is provided with a first metal film layer, the first metal film layer is provided with a first alignment mark, the first substrate is provided with a first through hole, and the position of the first alignment mark corresponds to the position of the first through hole;

step S2: providing a second substrate being a PCB, wherein the second substrate is provided with a second metal film layer, the second metal film layer is provided with a second alignment mark, the second substrate is provided with a second through hole, and the position of the second alignment mark corresponds to the position of the second through hole; and step S3: an oppositely bonding mechanism oppositely bonds the first substrate and the second substrate respectively via the first through hole and the second through hole by using the first alignment mark and the second alignment mark and the aligned first substrate and second substrate.

Preferably, in the step S3, the first substrate and the second substrate are oppositely bonded by using a charge-coupled device (CCD) lens.

Preferably, the first alignment mark is a metal alignment mark, and the first alignment mark is obtained by performing exposure and etching on the first metal film layer. The second alignment mark is a metal alignment mark, and the second alignment mark is obtained by performing exposure and etching on the second metal film layer. A first carrier layer with high light transmittance is disposed between the first metal film layer and the first substrate, and the first carrier layer is used as a supporting layer of the first alignment mark. A second carrier with high light transmittance is disposed between the second metal film layer and the second substrate, and the second carrier layer is used as a supporting layer of the second alignment mark.

Preferably, step S1 includes the following steps:

providing the first substrate, disposing a first adhesive layer on the first substrate, manufacturing a first through hole in the first substrate, and manufacturing a first opening in the first adhesive layer, wherein the position of the first through hole corresponds to the position of the first opening;

bonding the first carrier layer to the first adhesive layer provided with the first opening, wherein the first metal film layer is located on the surface, back on to the first substrate, of the first carrier layer; and patterning the first metal film layer to obtain a patterned first metal film layer including the first alignment mark;

step S2 includes the following steps:

providing the second substrate, disposing a second adhesive layer on the second substrate, manufacturing a second through hole in the second substrate, and manufacturing a second opening in the second adhesive layer, wherein the position of the second through hole corresponds to the position of the second opening;

bonding the second carrier layer to the second adhesive layer provided with the second opening, wherein the second metal film layer is located on the surface, back on to the second substrate, of the second carrier layer; and patterning the second metal film layer to obtain a patterned second metal film layer including the second alignment mark.

Preferably, the first through hole completely covers the first alignment mark, and the second through hole completely covers the second alignment mark.

Preferably, during the oppositely bonding of the first substrate and the second substrate in step S3, a large-sized substrate is used. After step S3, the manufacturing method further includes a hot-pressing cell formation step to manufacture a plurality of cells, and then single-grained liquid crystal phase shifter cells according to claim 1 are obtained through a small-piece cutting process.

Preferably, the first alignment mark, the second alignment mark, the first through hole and the second through hole are disposed at the edge position of the large-sized substrate during manufacturing of a large board. During the small-piece cutting process, the first alignment mark, the second alignment mark, the first through hole and the second through hole are cut off.

Compared with the prior art, the present disclosure has the following beneficial effects.

1. In ultra-high-frequency wireless communications, the larger a dielectric constant and a dielectric loss value of a substrate material are, the higher the dielectric loss is, and the poorer signals are. The PCBs used in the present application are used as the substrates of the liquid crystal antenna. The dielectric constants and the dielectric loss of the PCBs are less than those of a glass substrate usually used by a liquid crystal panel, so that the PCBs are lower in dielectric loss, which is favorable for improving the performance of the liquid crystal antenna in ultra-high frequency band application.

2. Further, since the PCBs are non-transparent, it is not favorable for the oppositely bonding of the two substrates by using a transparent mark capturing method, causing a failure of accurate alignment, which cannot meet the design requirements of the antenna and then greatly reduces the performance of the antenna. In the present application, the alignment marks are further respectively disposed on the first metal film layer and the second metal film layer, and the through holes corresponding to the alignment marks in position are respectively disposed in the first substrate and the second substrate, so that the two substrates can be oppositely bonded by using the transparent mark capturing after the improvement.

3. Furthermore, in order to simplify the flow and the process, the alignment marks are the metal alignment marks obtained by performing exposure and etching on the corresponding metal film layers. The size of the metal alignment marks is smaller than that of the through holes. By disposing the transparent carrier layers between the metal film layers and the corresponding substrates, the metal alignment marks obtained by the exposure and etching can be supported, and the transparent carrier layers cannot affect the transparent mark capturing based oppositely bonding.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF REFERENCE NUMERALS

11: first substrate; 21: first metal film layer; 31: first alignment layer; 12: second substrate; 22: second metal film layer; 32: second alignment layer; 11: first through hole; 211: metal pattern; 212: first alignment mark; 40: sealant; 50: liquid crystal layer; 61: first adhesive layer; 611: first opening; and 71: first carrier layer.

DESCRIPTION OF THE EMBODIMENTS

In order to make objectives, technical solutions and advantages of the present disclosure clearer, the present disclosure is further described below in detail in conjunction with the accompanying drawings. Obviously, the embodiments described are only one part of embodiments of the present disclosure, but not all the embodiments. Based on the embodiments in the present disclosure, all other embodiments obtained by those ordinarily skilled in the art without doing creative work shall fall within the protection scope of the present disclosure.

The present disclosure is further described below in combination with the accompanying drawings and embodiments.

Embodiment I

Figure 1:
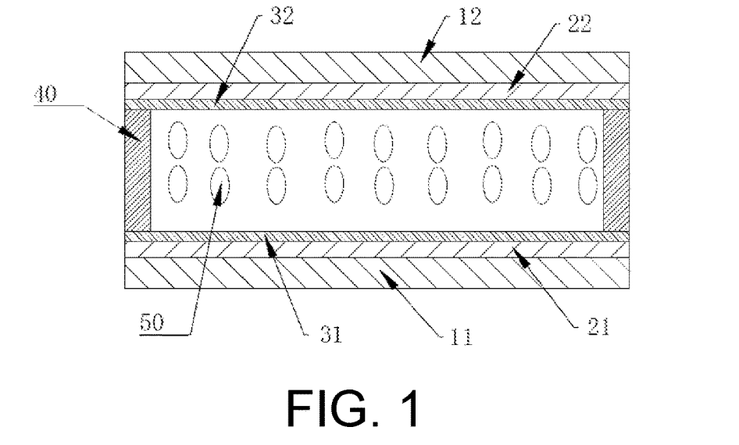
FIG. 1 is a structural schematic diagram of a liquid crystal phase shifter provided by Embodiment I of the present disclosure.

As shown in FIG. 1, illustrating Embodiment I of the present disclosure, the present specific embodiment provides a liquid crystal phase shifter. The liquid crystal phase shifter includes a first substrate 11 and a second substrate 12 which are disposed oppositely, and further includes a liquid crystal layer 50 located between the first substrate 11 and the second substrate 12.

Sealant 40 is further disposed between the first substrate 11 and the second substrate 12. The sealant 40 is located at the edges of the first substrate 11 and the second substrate 12, and is used for sealing the liquid crystal layer 50. Preferably, supports containing plastic balls and the epoxy sealant 40 are distributed in the liquid crystal layer 50.

The first substrate 11 is provided with a first conductive layer, and the second substrate 12 is provided with a second conductive layer.

The side of the first substrate 11 facing the second substrate 12 is provided with a first metal film layer 21, and the side of the second substrate 12 facing the first substrate 11 is provided with a second metal film layer 22.

The first metal film layer 21 and the second metal film layer 21 are both patterned metal film layers.

The first substrate 11 and the second substrate 12 are made of a material with relatively good stability and insulating effect and extremely low dielectric loss. The first substrate 11 and the second substrate 12 may be glass substrates, fused quartz, ABS, ceramic base materials, and ceramic thermosetting polymer composite materials. In the present embodiment, the first substrate 11 and the second substrate 12 are preferably PCBs.

In ultra-high-frequency wireless communications, the larger a dielectric constant and a dielectric loss value of a substrate material are, the higher the dielectric loss is, and the poorer signals are. The PCBs used in the present application are used as the substrates of the liquid crystal phase shifter. The dielectric constants and the dielectric loss of the PCBs are less than those of the glass substrate usually used by a liquid crystal panel, so that the PCBs are lower in dielectric loss, which is favorable for improving the performance of the liquid crystal phase shifter and a liquid crystal antenna in ultra-high frequency band application.

The PCBs used as the substrates of the liquid crystal phase shifter may be FR4 (epoxy resin glass fiber) boards, PTFE (polytetrafluoroethylene) boards, PPS (polyphenylene sulfide), PS (polystyrene), PPO (polyphenylene oxide), and other boards, but the PCBs are preferably high-frequency boards, and PTFE high-frequency boards are preferred. In the PCBs, the PTFE high-frequency boards have lower dielectric constant and dielectric loss. The lower dielectric loss may further improve the performance of the liquid crystal phase shifter and the liquid crystal antenna in the ultra-high frequency band application.

The first metal film layer 21 and the second metal film layer 22 are made of metal materials with high conductivity and magnetic permeability, and may be made of metals such as aluminum, copper, silver, gold, cadmium, chromium, molybdenum, niobium, nickel, iron, etc., preferably silver, copper, gold, aluminum and their alloys.

The lower the loss of wireless communication is, the higher the performance of the liquid crystal phase shifter is, that is, the lower the insertion loss (including the conductor loss) is, the higher the performance is. Since the metal materials required for the liquid crystal phase shifter require high conductivity and magnetic permeability, silver, copper, gold, aluminum and their alloys are generally used.

In the metallic materials such as silver, copper, gold, aluminum and their alloys, silver and gold have good conductivity, but they are expensive. As the most cost-effective solution, the metal materials of the metal film layers are preferably copper materials. The first metal film layer 21 and the second metal film layer 21 are both copper layers.

It is known that the thicknesses of the metal materials and the metal film layers are related to the conductor loss, and the skin effect is a reflection of the conductor loss. Since alternating current has the skin effect, the skin effect indirectly increases the resistance of a conductor, and its energy heat loss also increases accordingly. In high-frequency bands such as microwaves, the skin effect is very obvious. Different metal materials have different skin depths.

Skin effect: when there is alternating current or an alternating electromagnetic field in the conductor, the current distribution inside the conductor is not uniform. The current is concentrated on the outer skin portion of the conductor. The closer to the surface of the conductor is, the greater the current density is. The current inside the conductor wire is actually very low. As a result, the resistance of the conductor increases, and the power loss of the conductor also increases. This phenomenon is the skin effect.

The skin depth δ is provided by the following formula:

$$\delta = (1/\pi f \mu \sigma)^{1/2},$$

wherein μ represents the magnetic permeability of a metal material, σ is the conductivity of the conductor, and f represents a frequency of a signal carried by the liquid crystal antenna.

Since the metal materials required for the liquid crystal phase shifter require high electrical conductivity and magnetic permeability, and generally use silver, copper, gold, aluminum and their alloys, the skin effect required by the liquid crystal phase shifter and the liquid crystal antenna generally requires that the thicknesses of the metal film layers of the corresponding first metal film layer 21 and second metal film layer 22 are respectively 3 to 5 times the skin depth δ. The thicknesses of the metal film layers must reach a film thickness of lam to better ensure the performance of the liquid crystal antenna.

When both the first metal film layer 21 and the second metal film layer 22 are the copper layers, the thicknesses of the metal film layers of the first metal film layer 21 and the second metal film layer 22 are not less than 2.0 μm.

When the two substrates are oppositely bonded, an oppositely bonding and bonding mechanism needs to perform transparent mark capturing from the backs of the two substrates (that is, from the surfaces, back on to the corresponding metal film layers, of the substrates). Since the PCBs are light-proof, it is not favorable for the oppositely bonding of the two substrates by using the transparent mark capturing method, causing a failure of accurate alignment, which cannot meet the design requirements of the antenna and then greatly reduces the performance of the antenna. If manual blind bonding is used, the accuracy of bonding cannot be guaranteed. In order to solve this problem, in the manufacturing process of the liquid crystal phase shifter, when the first substrate and the second substrate are oppositely bonded, the first metal film layer 21 is provided with a first alignment mark 212, and the second metal film layer 22 is provided with a second alignment mark. The position, corresponding to the first alignment mark 212, of the first substrate 11 is provided with a first through hole 111, and the position, corresponding to the second alignment mark, of the second substrate 12 is provided with a second through hole.

The alignment marks may be round marks. Or, the alignment marks may also include marking lines in two directions perpendicular to each other. For example, the alignment marks may be cross marks, or two lines at an included angle of 90 degrees.

This application solves the problem of light transmittance by respectively disposing the alignment marks on the first metal film layer 21 and the second metal film layer 22, and respectively forming the through holes in positions, corresponding to the alignment marks, on the first substrate 11 and the second substrate 12, so that the oppositely bonding mechanism can align the two substrates and then assemble the two aligned substrates through the transparent mark capturing, and then a process of bonding the two substrates to form cells can be favorably implemented.

During oppositely bonding, the first substrate 11 and the second substrate 12 are oppositely bonded by using a CCD lens. The first substrate 11 is taken as an example. The CCD lens performs the transparent mark capturing from the first substrate 11 on the back of the first metal film layer 21, and can see the first alignment mark 212 through the first through hole 111 in the first substrate 11.

Preferably, the first through hole 111 completely covers the first alignment mark 212: assuming that there is a virtual plane, the plane, for example, is a plane where the first substrate 11 is located. A projection of the first through hole 111 on the plane can completely cover a projection of the first alignment mark 212 on this plane. Similarly, the second through hole completely covers the second alignment mark.

The first alignment mark 212 and the second alignment mark will be described as follows.

The first alignment mark 212 may be disposed on the surface, close to the first substrate 11, of the first metal film layer 21, so it can be seen through the first through hole 111. For example, a via hole is manufactured as an alignment mark, or only a partially transparent region is manufactured as an alignment mark, or an alignment mark is manufactured through laser, and the like. Similarly, the second alignment mark may be disposed on the surface, close to the second substrate 12, of the second metal film layer 22, so it can be seen through the second through hole.

However, more preferably, in order to simplify the flow and process, the alignment marks are metal alignment marks obtained by performing exposure and etching on the corresponding metal film layers. Specifically, the first alignment mark 212 is obtained by performing the exposure and etching on the first metal film layer 21, and the second alignment mark is obtained by performing the exposure and etching on the second metal film layer 22, and the first alignment mark 212 and the second alignment mark are metal alignment marks. It can be understood that the position of the first alignment mark 212 corresponds to the position of the second alignment mark.

Figure 2:
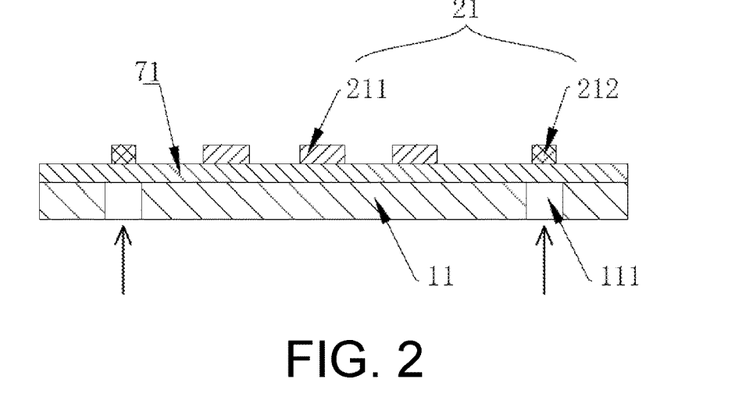
FIG. 2 is a structural schematic diagram of a first substrate, a first metal film layer and a first carrier layer of the liquid crystal phase shifter provided by Embodiment I of the present disclosure during oppositely bonding.

Furthermore, the first substrate 11 is taken as an example. As shown in FIG. 2, a transparent first carrier layer 71 is arranged between the first metal film layer 21 and the first substrate 11. The size of the metal alignment mark is generally smaller than the size of the through hole. By disposing the transparent carrier layers between the metal film layers and the corresponding substrates, the metal alignment marks obtained by the exposure and etching can be supported, and the transparent carrier layers will not affect the transparent mark capturing based oppositely bonding. Similarly, there is a transparent second carrier layer between the second metal film layer 22 and the second substrate 12.

The first carrier layer 71 and the second carrier layer may be PI (polyimide) layers, PET (polyethylene terephthalate) layers, or PE (polyethylene) layers, all of which have good light transmittance. However, it is more preferable that the first carrier layer 71 and the second carrier layer are the PI layers, and PI has the advantages of better light transmittance, good high-temperature resistance, and the like.

Figure 3:
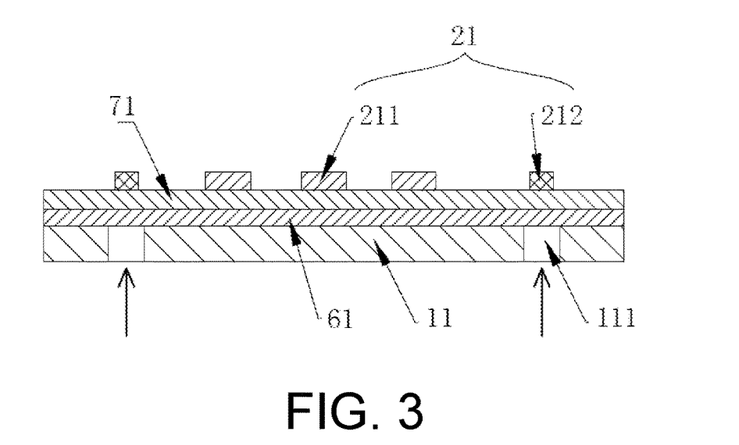
FIG. 3 is a structural schematic diagram of a first substrate, a first metal film layer, a first carrier layer and a first adhesive layer of the liquid crystal phase shifter provided by Embodiment I of the present disclosure during oppositely bonding.

In practical applications, an integrated copper-cladded PI base material may be used, that is, the PI base material layer is clad with a copper foil layer in a laminating manner, and the copper foil-cladded PI base material can replace the first carrier layer 71 and the first metal film layer 21, and cause the first carrier layer 71 and the first metal film layer 21 to be integrated. The copper foil-cladded PI base material may be attached to the corresponding substrate through an adhesive layer. As shown in FIG. 3, there is a first adhesive layer 61 between the first carrier layer 71 and the first substrate 11, and the first carrier layer 71 is attached to the first substrate 11 through the first adhesive layer 61. Similarly, there is a second adhesive layer between the second carrier layer and the second substrate 12. Or, in other embodiments, a carrier layer, such as a PI layer, may be attached to the substrate first, and then a metal film layer may be manufactured or disposed on the carrier layer. However, compared with the solution adopting the copper foil-cladded PI base material, this solution is that since the copper foil-cladded PI base material is generally an existing board, it may be purchased directly. Compared with the solution of attaching the carrier layer such as the PI layer to the substrate first, and then manufacturing or disposing the metal film layer on the carrier layer, this solution has the advantages of low cost and more time saving.

The first adhesive layer 61 and the second adhesive layer may be non-transparent adhesives commonly used in the PCBs, or may be transparent optical adhesives.

Figure 4:
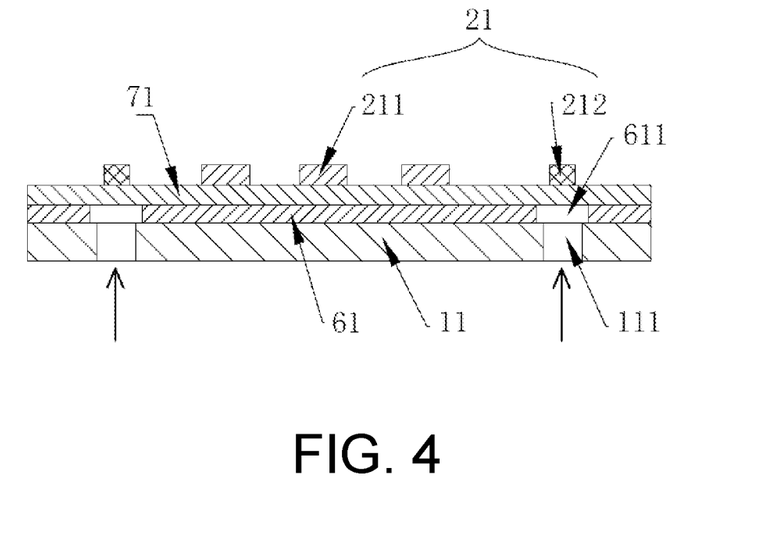
FIG. 4 is another structural schematic diagram of a first substrate, a first metal film layer, a first carrier layer and a first adhesive layer of the liquid crystal phase shifter provided by Embodiment I of the present disclosure during oppositely bonding.

When the first adhesive layer 61 and the second adhesive layer are the non-transparent adhesive layers, as shown in FIG. 4, the position, corresponding to the first alignment mark 212, of the first adhesive layer 61 is provided with a first opening 611, and the position, corresponding to the second alignment mark, of the second adhesive layer is provided with a second opening. The arrangement of the first opening 611 and the second opening causes the first adhesive layer 61 and the second adhesive layer not to hinder the transparent mark capturing based oppositely bonding.

The first opening 611 completely covers the first alignment mark 212: assuming that there is a virtual plane, the plane, for example, is a plane where the first substrate 11 is located. A projection of the first opening 611 on the plane can completely cover a projection of the first alignment mark 212 on this plane. Similarly, the second opening completely covers the second alignment mark. Preferably, the first opening 611 is not smaller than the first through hole 111 in the first substrate 11, and the second opening is not smaller than the second through hole in the second substrate 12.

The first through hole 111, the second through hole, the first opening 611 and the second opening are preferably manufactured before the carrier layers are attached, so as to prevent damage to the carrier layers or the metal film layers when the through holes or the openings are manufactured.

During the oppositely bonding, the first substrate and the second substrate are generally large-sized substrates. After the step of oppositely bonding and bonding, the manufacturing method of the liquid crystal phase shifter further includes the steps of hot-pressing cell formation, small piece cutting, filling and sealing, binding, and the like. It should be noted that the abovementioned arrangement of the first alignment mark 212, the second alignment mark, the first through hole 111 and the second through hole, and the arrangement of the first opening 611 and the second opening are to facilitate the transparent mark capturing of the alignment and bonding mechanism from the backs of the substrates during the oppositely bonding of the two substrates of the liquid crystal phase shifter, so as to realize precise alignment of the first substrate and the second substrate.

Therefore, the first alignment mark 212, the second alignment mark, the first through hole 111, and the second through hole are generally disposed at the edge positions of a liquid crystal phase shifter product. During subsequent small piece cutting, the first alignment mark 212, the second alignment mark, the first through hole 111 and the second through hole are generally cut off.

The liquid crystal phase shifter further includes a first alignment layer 31 and a second alignment layer 32 which are disposed on two sides of the liquid crystal layer 50, respectively. The first alignment layer 31 is prepared on the first substrate 11 on which the patterned metal film layer is formed, and the second alignment layer 32 is prepared on the second substrate 12 on which the patterned metal film layer is formed. The alignment layer is used to define an initial deflection angle of crystal molecules of the liquid crystal layer 50.

In one specific embodiment, metal patterns 211 on the patterned second metal film layer 22 include a phase shifter electrode. The phase shifter electrode is a planar transmission line used for transmitting microwave signals. The planar transmission line is preferably a microstrip line. The shape of the microstrip line may be of an S shape or a spiral shape. The shape of the microstrip line is not limited, as long as it may realize transmission of the microwave signals. Metal patterns 211 on the patterned first metal film layer 21 include a grounding electrode, and the liquid crystal phase shifter further includes an offset line. In one embodiment, the offset line may be disposed on the second metal film layer 22 of the second substrate 12. By applying a voltage between the microstrip line and the grounding electrode through the offset line, the effective dielectric constant of liquid crystals may be changed, thereby changing the phase of the microwave signal.

When no electric field is applied between the microstrip line and the grounding electrode, the liquid crystal molecules are arranged in a preset direction under the action of the first alignment layer and the second alignment layer. When an electric field is applied between the microstrip line and the grounding electrode, the electric field drives the deflection of the liquid crystal molecules in the liquid crystal layer 50.

The microwave signal is transmitted between the microstrip line and the grounding electrode. During the transmission of the microwave signal, the phase will be changed due to the deflection of the liquid crystal molecules, thereby realizing a phase shift function of the microwave signal. By controlling the voltage on the microstrip line and the ground electrode, the deflection angle of the liquid crystals in the liquid crystal layer 50 can be controlled, and thus the phase adjusted during the phase shifting can be controlled.

By utilizing the dielectric anisotropy characteristic and the low power consumption characteristic of a liquid crystal material, the effective dielectric constant of the liquid crystals is changed by controlling the voltage applied to the liquid crystal layer 50, thereby controlling the phase adjusted during the phase shifting. A two-dimensional pattern is formed by specially designed liquid crystal antenna units with different electrostatic capacitances. Electromagnetic waves received or emitted from the antenna are endowed with a phase difference corresponding to the electrostatic capacitance of each antenna unit, and the two-dimensional pattern formed by the antenna elements with the different electrostatic capacitances has strong directivity (beam scanning) in a specific direction, thereby realizing a mutual conversion function between the electromagnetic waves received or emitted from the antenna and a radio frequency signal (a voltage signal).

Compared with the prior art, the present disclosure has the following beneficial effects.

1. In ultra-high-frequency wireless communications, the larger a dielectric constant and a dielectric loss value of a substrate material are, the higher the dielectric loss is, and the poorer signals are. The PCBs used in the present application are used as the substrates of the liquid crystal phase shifter. The dielectric constants and the dielectric loss of the PCBs are less than those of a glass substrate usually used by a liquid crystal panel, so that the PCBs are lower in dielectric loss, which is favorable for improving the performance of the liquid crystal antenna in ultra-high frequency band application.

2. Further, the PCBs are PTFE high-frequency boards which have lower dielectric constant and dielectric loss. The lower dielectric loss can further improve the performance of the liquid crystal phase shifter and the liquid crystal antenna in the ultra-high frequency band application.

3. Since the PCBs are light-proof, it is not favorable for the alignment and bonding of the two substrates by using the transparent mark capturing method, causing a failure of accurate alignment, which cannot meet the design requirements of the liquid crystal phase shifter and then greatly reduces the performance of the liquid crystal antenna. In the present application, the alignment marks are further respectively disposed on the first metal film layer and the second metal film layer, and the through holes corresponding to the alignment marks in position are respectively disposed in the first substrate and the second substrate, so that the two substrates can be oppositely bonded by using the transparent mark capturing after the improvement. Furthermore, in order to simplify the flow and the process, the alignment marks are the metal alignment marks obtained by performing exposure and etching on the corresponding metal film layers. The size of the metal alignment marks is smaller than that of the through holes. By disposing the transparent carrier layers between the metal film layers and the corresponding substrates, the metal alignment marks obtained by the exposure and etching can be supported, and the transparent carrier layers cannot affect the transparent mark capturing based alignment and bonding.

Embodiment II

The present specific embodiment provides a liquid crystal antenna. The liquid crystal antenna includes the liquid crystal phase shifter in Embodiment I. The liquid crystal antenna further includes an antenna radiation unit used for radiating a microwave signal, thereby realizing feed-in and feed-out of the microwave signal.

In the present embodiment, the side, away from the second substrate 12, of the first substrate 11 is provided with an antenna radiation unit. The antenna radiation unit is made of a high-conductivity material. The antenna radiation unit may be a rectangular, round, or square patch, may realize corner cutting, and may also be attached to the liquid crystal phase shifter by a patch process. Or, a more preferable solution is that the antenna radiation unit is a patterned third metal film layer disposed on the side, away from the second substrate 12, of the first substrate 11.

Embodiment III

Figure 6:
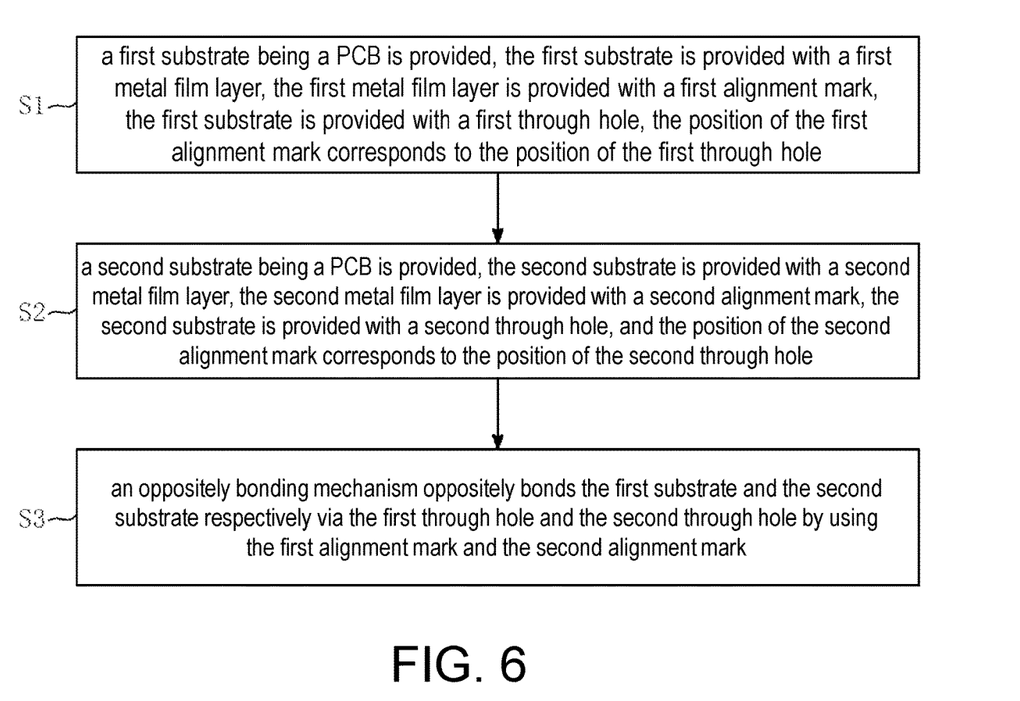
FIG. 6 is a flow chart of a manufacturing method of a liquid crystal phase shifter provided by Embodiment III of the present disclosure.

The present specific embodiment provides a manufacturing method of the liquid crystal phase shifter in Embodiment I. As shown in FIG. 6, the manufacturing method of the liquid crystal phase shifter includes the following steps.

Step S1: a first substrate 11 being a PCB is provided. The first substrate 11 is provided with a first metal film layer 21.

The first metal film layer 21 is provided with a first alignment mark 212. The first substrate 11 is provided with a first through hole 111. The position of the first alignment mark 212 corresponds to the position of the first through hole 111.

Step S2: a second substrate 12 being a PCB is provided. The second substrate 12 is provided with a second metal film layer 22, the second metal film layer 22 is provided with a second alignment mark. The second substrate 12 is provided with a second through hole, and the position of the second alignment mark corresponds to the position of the second through hole.

Step S3: an oppositely bonding and bonding mechanism oppositely bonds the first substrate 11 and the second substrate 12 respectively via the first through hole 111 and the second through hole by using the first alignment mark 212 and the second alignment mark and then assembles the aligned first substrate and second substrate.

It should be noted that the order of S1 and S2 can be adjusted.

Specifically, in the step S3, CCD transparent alignment usually used in oppositely bonding of the liquid crystal panel is used to implement accurate bonding: a CCD lens is used. The CCD lens pre-aligns the first substrate 11 and the second substrate 12 respectively via the first through hole 111 and the second through hole by using the first alignment mark 212 and the second alignment mark, and the first substrate 11 and the second substrate 12 slowly move to a bonded state after the alignment.

Description of a manufacturing process of the first alignment mark 212 and the second alignment mark is as follows.

The first alignment mark 212 may be disposed on the surface, close to the first substrate 11, of the first metal film layer 21, so it can be seen through the first through hole 111. For example, a via hole is manufactured as an alignment mark, or only a partially transparent region is manufactured as an alignment mark, or an alignment mark is manufactured through laser, and the like. Similarly, the second alignment mark may be disposed on the surface, close to the second substrate 12, of the second metal film layer 22, so it can be seen through the second through hole.

However, more preferably, in order to simplify the flow and process, the alignment marks are metal alignment marks obtained by performing exposure and etching on the corresponding metal film layers. Specifically, the first alignment mark 212 is obtained by performing the exposure and etching on the first metal film layer 21, and the second alignment mark is obtained by performing the exposure and etching on the second metal film layer 22, and both the first alignment mark 212 and the second alignment mark are metal alignment marks.

The size of the metal alignment marks is generally smaller than that of the through holes, so as to perform the transparent mark capturing via the through holes. After the exposure and etching, metals at the peripheries of the metal alignment marks are etched away, so that the metal alignment marks are not supported. As an improved solution, a transparent first carrier layer 71 is arranged between the first metal film layer 21 and the first substrate 11, and a transparent second carrier layer is arranged between the second metal film layer 22 and the second substrate 12. By disposing the transparent carrier layers between the metal film layers and the corresponding substrates, the metal alignment marks obtained by the exposure and etching can be supported, and the transparent carrier layers will not affect the transparent mark capturing based alignment and bonding.

The first carrier layer 71 and the second carrier layer may be PI layers, PET layers, or PE layers, all of which have good light transmittance. However, more preferably, the first carrier layer 71 and the second carrier layer are the PI layers, and PI has the advantages of better light transmittance, good high-temperature resistance, and the like, and can endure high-temperature baking in a subsequent alignment layer manufacturing process.

In actual applications, copper foil-cladded PI base materials may be used as the metal film layers and the carrier layers. The copper foil-cladded PI base materials are obtained by cladding PI base material layers with copper foil layers in a laminating manner. The copper foil-cladded PI base materials may be attached to the corresponding substrates through adhesive layers. Specifically, a first adhesive layer 61 is arranged between the first carrier layer 71 and the first substrate 11, and a second adhesive layer is arranged between the second carrier layer and the second substrate 12.

Or, in other embodiments, a carrier layer, such as a PI layer, may be attached to the substrate first, and then a metal film layer may be manufactured or disposed on the carrier layer.

Figure 7:
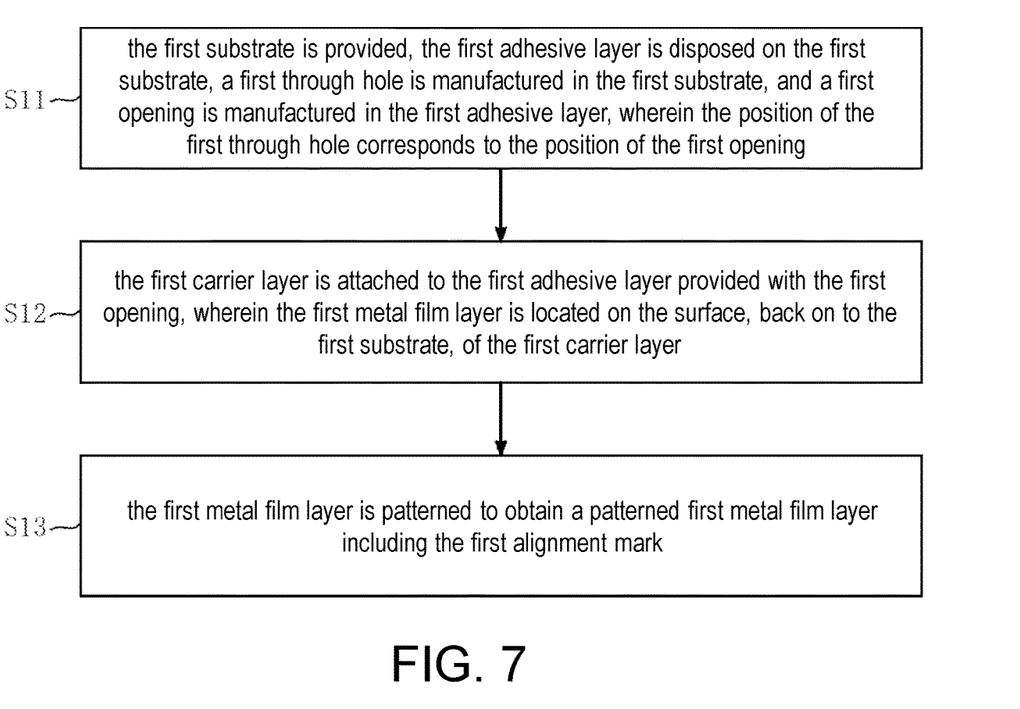
FIG. 7 is a flow chart of S1 in the manufacturing method of the liquid crystal phase shifter provided by Embodiment III of the present disclosure.

Therefore, further, as shown in FIG. 7, step S1 includes the following steps.

Step S11: the first substrate 11 is provided, the first adhesive layer 61 is disposed on the first substrate 11, a first through hole 111 is manufactured in the first substrate 11, and a first opening 611 is manufactured in the first adhesive layer 61, wherein the position of the first through hole 111 corresponds to the position of the first opening 611.

Step S12: the first carrier layer 71 is attached to the first adhesive layer 61 provided with the first opening 611, wherein the first metal film layer 21 is located on the surface, back on to the first substrate 11, of the first carrier layer 71.

Step S13: the first metal film layer 21 is patterned to obtain a patterned first metal film layer 21 including the first alignment mark 212.

It should be noted that in step S11, the first through hole 111 and the first opening 611 may be manufactured at the same time, or manufactured in sequence.

In step S12, the first metal film layer 21 and the first carrier layer 71 may be a whole. The first carrier layer 71 is attached to the first adhesive layer 61. For example, the copper foil-cladded PI base material is directly used to be attached to the first adhesive layer 61. Or, after the first carrier layer 71 is independently attached to the first adhesive layer 61 provided with the first opening 611, the first metal film layer 21 is manufactured or disposed on the first carrier layer 71.

Similarly, step S2 includes the following steps.

Step S21: the second substrate 12 is provided, a second adhesive layer is disposed on the second substrate 12, a second through hole is manufactured in the second substrate 12, and a second opening is manufactured in the second adhesive layer, wherein the position of the second through hole corresponds to the position of the second opening.

Step S22: the second carrier layer is attached to the second adhesive layer provided with the second opening, wherein the second metal film layer 22 is located on the surface, back on to the second substrate 12, of the second carrier layer.

Step S23: the second metal film layer 22 is patterned to obtain a patterned second metal film layer 22 including the second alignment mark.

It should be noted that in S21, the second through hole and the second opening may be manufactured at the same time, or manufactured in sequence.

In step S22, the second metal film layer 22 and the second carrier layer may be a whole. The second carrier layer is attached to the second adhesive layer. For example, the copper foil-cladded PI base material is directly used to be attached to the second adhesive layer. Or, after the second carrier layer is independently attached to the second adhesive layer provided with the second opening, the second metal film layer 22 is manufactured or disposed on the second carrier layer.

It should be noted that, before step S3 of oppositely bonding the first substrate 11 and the second substrate 12 and then bonding the aligned first substrate and second substrate, the manufacturing method of the liquid crystal phase shifter further includes a specific process for patterning the first metal film layer 21 and the second metal film layer 22, and further includes a process step of manufacturing alignment layers and sealant 40 after the metal film layers are patterned.

The process method for patterning the metal film layers is known to those skilled in the art, and can be obtained through processes of photoresist coating, precuring, exposure, developing, etching, and stripping.

The alignment layers may be manufactured by using a PI rubbing process in the prior art to form an alignment groove on the surface. For example, an APR board may be used to transfer preset dripping alignment liquid onto the corresponding substrates with the metal patterns, and causes the liquid to fully react through high-temperature baking. Meanwhile, solvents are volatilized, and solid alignment film layers are finally formed. The alignment film is polished with velvet cloth or cotton cloth in one direction, and finally the liquid crystal molecules are arranged in parallel according to a preset polishing direction, which will not be repeated here.

The manufacturing process steps of the sealant 40 are known to those skilled in the art, and will not be repeated here.

After step S3, the manufacturing method of the liquid crystal phase shifter further includes the steps of hot-pressing cell formation, small-piece cutting, filling and sealing, binding, and the like.

During the oppositely bonding, the first substrate 11 and the second substrate 12 are generally large-sized substrates. During S3 of oppositely bonding the first substrate 11 and the second substrate 12 and then bonding the aligned first substrate and second substrate, a large board is used. After S3 of oppositely bonding and bonding, the manufacturing method of the liquid crystal phase shifter further includes the steps of hot-pressing cell formation, small-piece cutting, filling and sealing, binding, and the like.

By the hot-pressing cell formation, pre-bonded substrates are cured by a high-pressure and high-temperature process, and a certain cell gap will be formed. After sufficient curing, a plurality of cells with high bonding strength and high mechanical strength will eventually be formed. Then, a plurality of single-grained liquid crystal phase shifter cells can be obtained through the small-piece cutting process.

It should be noted that the abovementioned arrangement of the first alignment mark 212, the second alignment mark, the first through hole 111 and the second through hole, and the arrangement of the first opening 611 and the second opening are to facilitate the transparent mark capturing of the oppositely bonding and bonding mechanism from the backs of the substrates during the oppositely bonding of the two substrates of the liquid crystal phase shifter, so as to realize precise alignment of the first substrate and the second substrate.

Figure 5:
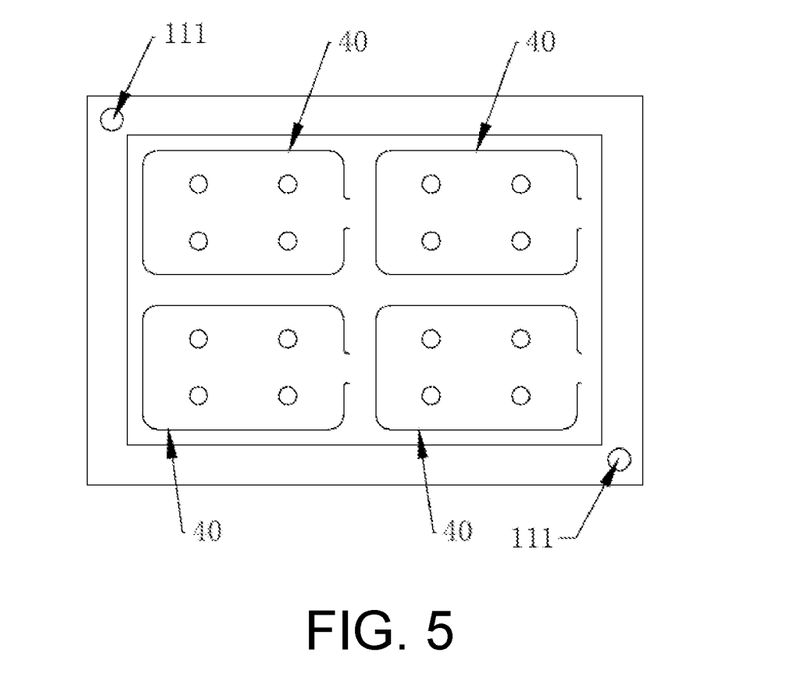
FIG. 5 is a structural schematic diagram of a first substrate of a large-sized substrate during oppositely bonding of the liquid crystal phase shifter provided by Embodiment I of the present disclosure.

Therefore, the first alignment mark 212, the second alignment mark, the first through hole 111 and the second through hole are generally disposed at the edge positions of a liquid crystal phase shifter product. FIG. 5 illustrates a schematic diagram of a first substrate 11 of a large-sized substrate. The large-sized substrate includes a plurality of independent units. The first through hole 111 is located at the edge position of the large-sized substrate. Four independent units are illustrated in FIG. 5 only, and each unit includes independent sealant 40, but the number of sealant is not limited to this. During the subsequent small-piece cutting, the first alignment mark 212, the second alignment mark, the first through hole 111, and the second through hole are cut off, and do not exist in the liquid crystal phase shifter product.

Compared with the prior art, the present disclosure has the following beneficial effects.

The present disclosure provides the manufacturing method for manufacturing the liquid crystal phase shifters in batches by using the PCBs as the substrates and combining the liquid crystal panel. The dielectric constants and the dielectric loss of the PCBs are less than those of the glass substrate usually used by the liquid crystal panel, so that the PCBs are lower in dielectric loss, which is favorable for improving the performance of the liquid crystal phase shifter in ultra-high frequency band application.

The present disclosure further solves the problem that original non-transparent PCBs cannot use the transparent oppositely bonding and bonding mechanism of the liquid crystal panel to implement accurate bonding of the two substrates. The alignment marks are respectively disposed on the first metal film layer and the second metal film layer, and the through holes corresponding to the alignment marks in position are respectively disposed in the first substrate and the second substrate, so that the two substrates can be oppositely bonded by using the transparent mark capturing after the improvement.

In order to simplify the flow and the process, the alignment marks are the metal alignment marks obtained by performing exposure and etching on the corresponding metal film layers. The size of the metal alignment marks is smaller than that of the through holes. By disposing the transparent carrier layers between the metal film layers and the corresponding substrates, the metal alignment marks obtained by the exposure and etching can be supported, and the transparent carrier layers cannot affect the transparent mark capturing based oppositely bonding.

It should be finally noted that the above embodiments are only used to describe the technical solutions of the present disclosure, and not intended to limit the present disclosure. Although the embodiments of the present disclosure has been described in detail with reference to the preferred embodiments, those of ordinary skill in the art should understand that they can still make modifications or equivalent replacements to the technical solutions of the embodiments of the present disclosure, and these modifications or equivalent replacements do not cause the modified technical solutions to depart from the scopes of the technical solutions of the embodiments of the present disclosure, either.

What is claimed is:

1. A manufacturing method of a liquid crystal phase shifter, which is used for manufacturing the liquid crystal phase shifter comprising: a first substrate and a second substrate which are disposed oppositely, and a liquid crystal layer located between the first substrate and the second substrate; a first metal film layer is disposed on a side of the first substrate facing the second substrate; a second metal film layer is disposed on a side of the second substrate facing the first substrate; the first metal film layer and the second metal film layer are both patterned metal film layers; and the first substrate and the second substrate are both printed circuit boards (PCBs), wherein the manufacturing method includes the following steps:

step S1: providing the first substrate being a printed circuit board (PCB), wherein the first substrate is provided with the first metal film layer, the first metal film layer is provided with a first alignment mark, the first substrate is provided with a first through hole, and a position of the first alignment mark corresponds to a position of the first through hole;

step S2: providing the second substrate being a PCB, wherein the second substrate is provided with the second metal film layer, the second metal film layer is provided with a second alignment mark, the second substrate is provided with a second through hole, and a position of the second alignment mark corresponds to a position of the second through hole; and step S3: oppositely bonding the first substrate and the second substrate respectively via the first through hole and the second through hole by using the first alignment mark and the second alignment mark and bonding the aligned first substrate and second substrate, wherein the first alignment mark is a metal alignment mark, and the first alignment mark is obtained by performing exposure and etching on the first metal film layer;

the second alignment mark is a metal alignment mark, and the second alignment mark is obtained by performing exposure and etching on the second metal film layer;

a first carrier layer with high light transmittance is disposed between the first metal film layer and the first substrate, and the first carrier layer is used as a supporting layer of the first alignment mark; and a second carrier with high light transmittance is disposed between the second metal film layer and the second substrate, and the second carrier layer is used as a supporting layer of the second alignment mark, wherein the step S1 includes the following steps:

providing the first substrate, disposing a first adhesive layer on the first substrate, manufacturing a first through hole in the first substrate, and manufacturing a first opening in the first adhesive layer, wherein the position of the first through hole corresponds to a position of the first opening;

bonding the first carrier layer to the first adhesive layer provided with the first opening, wherein he first metal film layer is located on the surface, back on to the first substrate, of the first carrier layer; and patterning the first metal film layer to obtain a patterned first metal film layer including the first alignment mark;

the step S2 includes the following steps:

providing the second substrate, disposing a second adhesive layer on the second substrate, manufacturing a second through hole in the second substrate, and manufacturing a second opening in the second adhesive layer, wherein the position of the second through hole corresponds to a position of the second opening;

bonding the second carrier layer to the second adhesive layer provided with the second opening, wherein the second metal film layer is located on the surface, back on to the second substrate, of the second carrier layer; and patterning the second metal film layer to obtain a patterned second metal film layer including the second alignment mark.

2. The manufacturing method of a liquid crystal phase shifter according to claim 1, characterized in that the first through hole completely covers the first alignment mark, and the second through hole completely covers the second alignment mark.

3. The manufacturing method of a liquid crystal phase shifter according to claim 1, characterized in that during the oppositely bonding of the first substrate and the second substrate in the step S3, a large-sized substrate is used; after the step S3, the manufacturing method further includes a hot-pressing cell formation step to manufacture a plurality of cells, and then liquid crystal phase shifter cells having single grains are obtained through a small-piece cutting process.

4. The manufacturing method of a liquid crystal phase shifter according to claim 3, characterized in that the first alignment mark, the second alignment mark, the first through hole and the second through hole are disposed at an edge position of the large-sized substrate during manufacturing of a large board; during the small-piece cutting process, the first alignment mark, the second alignment mark, the first through hole and the second through hole are cut off.

* * * * *